United States Patent [19]

Charlesworth et al.

[11] Patent Number: 4,755,656
[45] Date of Patent: Jul. 5, 1988

[54] TOASTER

[75] Inventors: Eric Charlesworth, Sheffield; Stephen D. Kelly, Mexborough, both of England

[73] Assignee: Morphy Richards Limited, South Yorkshire, England

[21] Appl. No.: 22,000

[22] Filed: Mar. 5, 1987

[30] Foreign Application Priority Data

Mar. 12, 1986 [GB] United Kingdom ............... 8606138
Apr. 17, 1986 [GB] United Kingdom ............... 8609365

[51] Int. Cl.$^4$ ............................................. H05B 1/02
[52] U.S. Cl. .................................... 219/492; 219/493; 219/501; 219/518; 99/327; 99/328; 99/329 P
[58] Field of Search ............... 219/492, 493, 491, 501, 219/506, 497, 518, 494, 489; 99/327, 388, 329 R, 329 P, 329 RT, 333, 332, 330

[56] References Cited

U.S. PATENT DOCUMENTS

| 3,089,406 | 5/1963 | Turner | 99/329 P |
|---|---|---|---|
| 3,487,770 | 1/1970 | Svenson | 99/337 |
| 4,395,621 | 7/1983 | Parker | 99/329 P |
| 4,418,268 | 11/1983 | Munshaw | 219/492 |
| 4,467,184 | 8/1984 | Loessel | 219/492 |
| 4,510,376 | 4/1985 | Schneider | 219/518 |

FOREIGN PATENT DOCUMENTS

| 618921 | 3/1949 | United Kingdom . |
|---|---|---|
| 669400 | 4/1952 | United Kingdom . |
| 908530 | 10/1962 | United Kingdom . |
| 1273279 | 5/1972 | United Kingdom . |
| 1599078 | 9/1981 | United Kingdom . |
| 2177271A | 1/1987 | United Kingdom . |

Primary Examiner—M. H. Paschall
Attorney, Agent, or Firm—Silverman, Cass, Singer & Winburn, Ltd.

[57] ABSTRACT

An electrical toaster is provided with timer means which is initiated when a food product carrier is secured in an operative position adjacent a toasting element. The timer means normally releases the carrier from its operative position after a toasting interval. In the event of a malfunction, the timer means operates a cut-out to interrupt the supply of power to the toasting element within a predetermined period to prevent combustion or ignition of the food product. The latter period is longer than the normal toasting interval. The timer means may include first and second timing devices for respectively timing the toasting interval and the predetermined cut-out period. Alternatively the timer means provides respective outputs for controlling the toasting interval and the cut-out period.

10 Claims, 3 Drawing Sheets

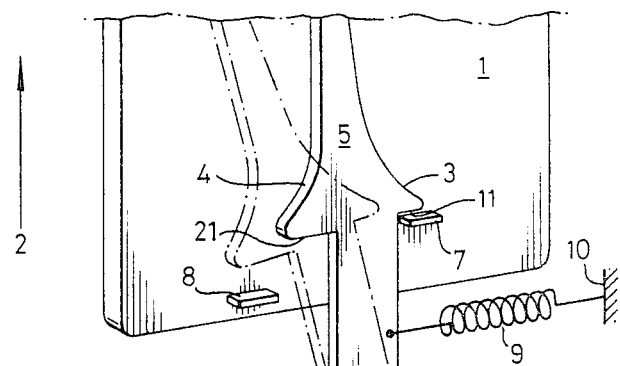
Fig.1
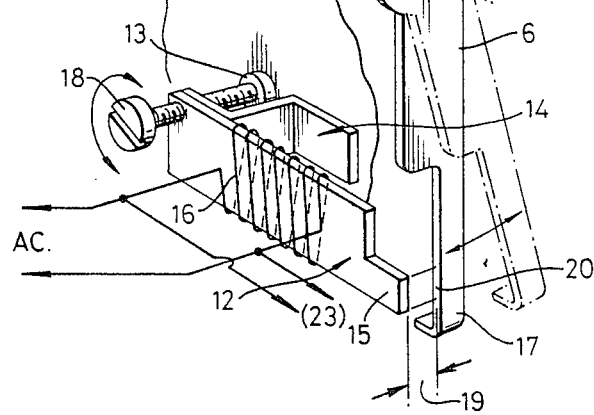
Fig.2
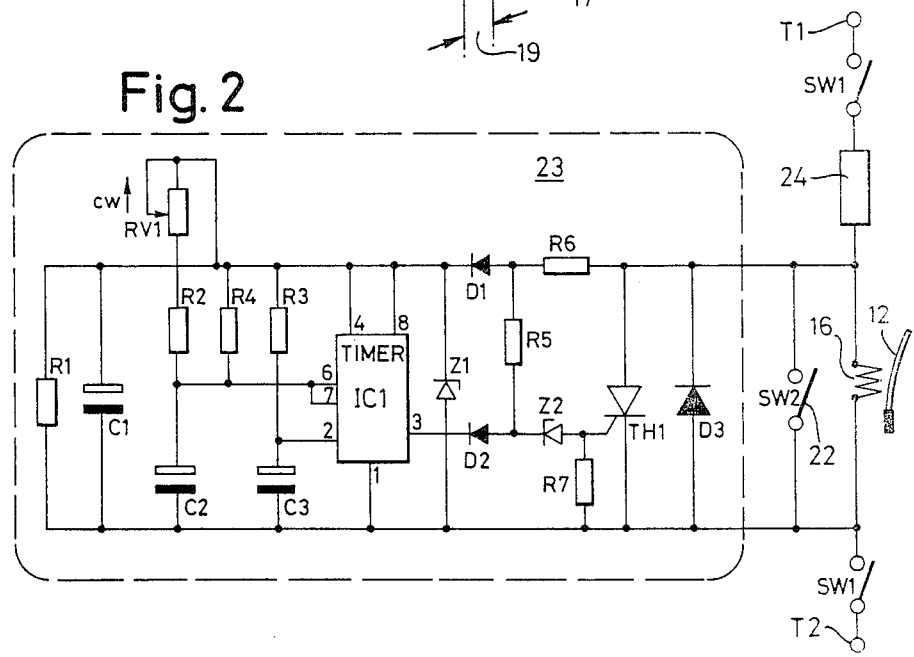

TOASTER

This invention relates to an electrical toaster which includes timing means to provide an adjustable toasting period and which further includes a cut-out to prevent combustion, or ignition of a food product in the event of a malfunction.

Most conventional toasters are of the type which comprise timing means initiated when a spring-loaded carrier is moved into a latched position adjacent one or more toasting elements. The timing means releases the latch after a predetermined toasting interval, which may be adjustable by means of a "shade" control, to allow the carrier to move into a position which is removed from the toasting element. This movement is utilised to operate a switch for interrupting the supply of power to the toasting element.

Toasters of the latter type may employ either electronic or mechanical timing devices. The most popular mechanical device incorporates a bimetallic strip which is heated by an electrical element (hereinafter referred to as the "bimetal heating element"). Usually, when the spring-loaded carrier is depressed into its latched position, power is supplied to the bimetal heating element which causes the bimetallic strip to deform. The end of the strip then approaches a "target" which is displaced in order to cause partial release of the latching mechanism, whereby the carrier moves slightly into a secondary latched position. This slight movement causes electrical contacts to cut-off the supply of electrical power to the bimetal heating element. This slight movement of the carrier also releases a second "target" into the path of contracting movement of the strip, whereby displacement of this second target releases the carrier from its secondary latched position. The carrier then springs upwardly from the toaster body, thereby removing the food product from the vicinity of the toasting element and also causing the power supply (to the toasting element) to be interrupted.

Mechanisms of the latter type are often equipped with a "shade" control which enables the toasting interval to be adjusted in order to vary the shade (i.e. colour) of the toast made by the toaster. Most conventional shade controls physically adjust the positions of the "targets", in order to adjust the instants at which the primary and secondary latches are released.

Some conventional toasters of the above-described type are not always reliable, especially when the shade control is set to a "dark" setting. For example, instead of toasting bread to a dark brown shade, the toast is burnt. In such a case, overheating of the bread may occur to a stage where combustion, or even ignition takes place. Besides the production of smoke, due to combustion, there is clearly a fire hazard.

Several factors may contribute to the above-mentioned problem. For example, a badly engineered bimetallic control mechanism may not operate reliably, each time the toaster is used, and the toasting time can be exceeded by an extent leading to combustion of the food product. Alternatively, whilst the bimetallic part of the mechanism may operate satisfactorily, the latching mechanism may stick. In these circumstances, the food product remains in position adjacent the energised toasting element and the main switch is not operated, at the end of a toasting interval, to interrupt the supply of power to the toasting element. This can clearly lead to ignition of the food product. Even where the bimetallic strip eventually releases the latching mechanism, combustion can have taken place resulting in the production of smoke.

Whilst a temperature-sensitive cut-out could be fitted to the toaster to interrupt the supply of power to the toasting element in the event of over-heating, such a device would not provide reliable protection. For example, a problem arises as to where to site such a thermal cut-out within the toaster body so that it responds when a predetermined temperature has been exceeded. Moreover it is difficult to determine a particular temperature at which the cut-out should operate, because the toaster body may become quite hot, with continued use, without the need to interrupt the supply of power to the toasting element. In addition, a thermal cut-out may not always reliably respond in time to prevent combustion of the food product.

The present invention seeks to overcome the problems noted above.

In accordance with the invention, a toaster comprises timing means initiated when a food product carrier is secured in an operative position adjacent a toasting element, the timing means releasing the carrier from its operative position after a predetermined interval to allow the carrier to move into a position where it is removed from the toasting element, the predetermined interval being the time intended for toasting a food product supported by the carrier; said timing means also being adapted to interrupt the supply of power to the toasting element within a predetermined period for preventing combustion or ignition of the food product when the carrier does not move into said position where it is removed from the toasting element, the latter period being longer than the predetermined interval for toasting the food product.

In a preferred embodiment of the invention, the timing means comprises a first timing device for controlling the toasting interval, and a second timing device for controlling said predetermined period. The second timing device provides an output for operating a cut-out in series with the toasting element. The cut-out may be gate controlled device, such as a triac, which is turned off at the end of said predetermined period. The first timing device may be a bimetallic actuator and the second timing device may comprise an electronic timer. Where an electronic timer is used, means are provided for resetting the timer to zero each time the toaster is initially energised. In a preferred embodiment of the invention, the second timing device includes a capacitor which is charged over the predetermined period and switching means which is triggered as a result of the charge on the capacitor, at the end of said period, in order to operate the cut-out.

In our co-pending GB Patent Application No. 8602113, an electrical toaster is disclosed which is fitted with a bimetallic actuator. This actuator co-operates with an electronic timer to provide an adjustable toasting period. Such a timer could be either modified, or used with other circuitry, in order to provide a first output which is used in timing the toasting period and a second output which is used to operate a cut-out to prevent combustion, or ignition of the food product.

Preferred embodiments of the invention will now be described with reference to FIGS. 4–6 of the accompanying schematic drawings, in which:

FIG. 1 illustrates a bimetallic actuator which is used with an electronic shade control as disclosed in our GB Patent Application No. 8602113.

FIG. 2 is a circuit diagram of the latter-mentioned electronic shade control,

Figure 3:
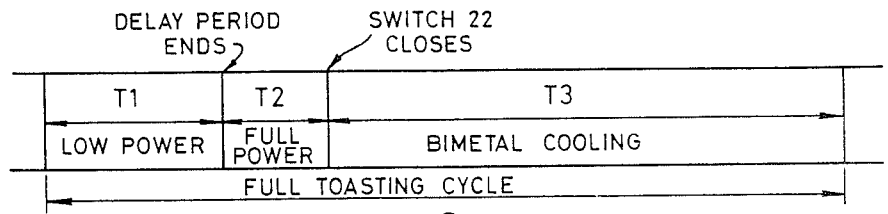
FIG. 3 is a timing diagram.

A description will first be given, with reference to FIGS. 1 and 2, of the bimetallic actuator, and electronic shade control disclosed in our GB Patent Application No. 8602113. However, it will be understood that the bimetallic actuator may alternatively be of a conventional construction.

FIG. 1 illustrates the main features of a latching mechanism in a toaster having a spring-loaded bread carrier 1. The general construction of a toaster having a spring-loaded bread carrier will be familiar to those skilled in the art and hence no detailed description is necessary.

Carrier 1 (not shown in detail) is normally biased upwardly in the direction of arrow 2. When carrier 1 is pressed down into the toaster body (not shown), the sloping sides 3, 4 of an arrow-shaped head 5 of a lever 6 are sequentially deflected by abutments 7,8 fixed to the carrier 1. A tension spring 9 has one end fixed to the upper part of lever 6 and its other end anchored to a fixed part 10 of the toaster body. Spring 9 biases lever 6 in a clockwise direction whereby a camming surface 11 engages abutment 7 when the carrier 1 is in its lowermost operative toasting position. The carrier 1 is thereby latched and is prevented from springing upwardly against the return force of the spring-loading (not shown) which operates in the direction of arrow 2.

A bimetallic member of strip 12 has one end anchored to a Z-shaped bracket 14 which is anchored to the toaster body so that its free end 15 moves when the bimetallic strip deforms under the action of heat. A coil of resistance wire is wound on the strip 12 and this will be hereinafter referred to as a "bimetallic heating element" 16. When the bimetallic heating element 16 is supplied with sufficient power, it causes the end 15 of the strip 12 to approach the lower end 17 of lever 6. An adjustment screw 18 threadably engages the anchored end of the strip 12 and bracket 14, the end of the screw bearing against a threaded insert 13 fixed to the toaster body so that the screw may be adjusted to vary the width of a gap 19 between the free end 15 of the strip 12 and a confronting edge 20 of the lower end of the lever. Apart from adjustments for the purpose of manufacturing tolerances, the width of the gap 19 remains constant.

When the bimetallic heating element 16 is supplied with sufficient power to cause the bimetallic strip 12 to deflect, the free end 15 of strip 12 moves towards and eventually engages the edge 20 of the lever 6. Further deflection of the strip 12 causes the lever 6 to rotate in an anticlockwise direction so that the camming surface 11 moves clear of abutment 7. Due to the spring-loaded bias on the carrier 1, the carrier then moves upwardly, by a short distance, until a camming surface 21 on the head 5 engages the abutment 8 fixed to carrier 1. This is represented by a broken line in the drawing. This partial release of the latching mechanism, which enables a small displacement of the carrier 1, is used to operate the contacts of a switch 22 (see FIG. 2) which shunts the bimetallic heating element 16 so that the bimetallic strip 12 is no longer heated. The function of switch 22 will be more readily appreciated from the circuit diagram of FIG. 2, which will be described in more detail below.

As the bimetallic strip 12 is still hot, it has sufficient stored energy to overcome the bias of spring 9 and so the lever 6 is temporarily held in its counterclockwise rotated position. However, as the bimetallic strip 12 cools, its end 15 starts to move away from the lower end of lever 6 and the spring 9 rotates lever 6 in a clockwise direction until a point is reached where camming surface 21 is drawn clear of abutment 8. At this point, the latching mechanism is fully released, and the carrier 1 springs upwardly due to its spring-loaded bias. This removes the bread from a position opposite the toasting element to prevent the toast from burning.

It will be noted that the latching mechanism, described with reference to FIG. 1, has few moving parts and that the bimetallic strip 12 does not need to exert any positive force to cause the latching mechanism to be released. As the strip 12 cools down, it is simply pushed aside by the lower end 17 of lever 6 due to the bias exerted by spring 9.

Referring to FIG. 2, a description will now be given of the electronic shade control circuitry associated with the bimetallic strip 12. FIG. 3 will also be referred to, since this is a schematic timing diagram which illustrates certain intervals that occur during a toasting cycle.

In FIG. 2, switch 22 and the circuitry 23 (outlined with a broken line) are connected in parallel with the bimetallic heating element 16. Element 16 is connected in series with a toasting element 24 (e.g. one or more radiant electric heaters) located within the toaster body. A double-pole switch SW1 (which may alternatively be a single pole switch on the live side) connects the toaster element and the bimetallic heating element 16 to main supply terminals T1, T2. Switch SW1 is normally open and is operated by movement of carrier 1, i.e. it closes when the carrier 1 is pressed down into its operative toasting position and it is opened when the carrier returns to its raised position after being released by the latching mechanism.

Diode D3 shunts half cycles of one polarity across the bimetallic heating element 16 and thereby reduces the amount of power flowing through the bimetallic heating element 16 due to the half cycles of the opposite polarity. A diode D1 conducts these opposite polarity half cycles to provide a DC power supply having a voltage reduced by resistor R6 and smoothed by capacitor C1 (resistor R1, which is optional, discharges C1 between toasting cycles). This DC supply operates a timing network including an integrated circuit timer IC1 (e.g. of the 555 type).

A gate-controlled device in the form of a thyristor TH1, forms a shunt path for diverting a proportion of the power supplied by the opposite polarity half cycles during a "delay period". During this "delay period" the bimetallic heating element 16 does not receive enough power to cause any appreciable response in the bimetallic strip 12. A resistor network including resistors R5 and R7 and zener diode Z2, provides a gate current for triggering thyristor TH1 during each opposite polarity half cycle of power supplied across the bimetallic heating element 16. This trigger voltage is supplied throughout the "delay period" which is controlled by timer IC1. The trigger point is decided by zener diode Z2 since no gate current flows until the zener voltage is reached.

Resistors R2,R3,R4, capacitors C2,C3 and variable resistor RV1 are connected to the integrated circuit timer IC1, as shown, to provide suitable biasing for operating the timer and for controlling the "delay period". The adjustable resistor RV1 can be adjusted (by the user) to vary the length of the "delay period" to control the shade of the toast. Resistor R4 (which is optional) has a value which adjusts the limits of the range of adjustment of variable resistor RV1. Various other connections of the timer to the positive and negative supply rails are as shown in FIG. 2.

The operation of the circuitry will now be described.

When switch SW1 is closed, AC power is supplied to toaster element 24 and to the bimetallic heating element 16. Both positive and negative half cycles of power are dissipated in the toaster element 24, whereby the toaster element radiates heat for toasting bread when the carrier is in its operative position. As explained above, half cycles of one polarity have no effect on the bimetallic heating element 16. Half cycles of the opposite polarity would normally be dissipated in the bimetallic element 16, but a proportion of this power is diverted through the shunt path containing thyristor TH1 during the "delay period". The trigger voltage is set at a low value so that, for example, only about a quarter of the power in the positive half cycles flows through the bimetallic heating element 16 in the delay period. In a typical arrangement, the bimetallic heating element 16 normally dissipates about 25 watts of power, but only 6–8 watts when thyristor TH1 provides a shunt path.

Thyristor TH1 is triggered in each opposite polarity half cycle during delay period T1 as shown in FIG. 3. During this delay period, the bimetallic heating element 16 is on "low power", since most of the power is diverted through thyristor TH1. The period T1 can be adjusted by means of variable resistor RV1 to control the shade of the toast. The timer IC1 controls the length of the delay period T1. At the end of this period, the network which provides a gate trigger voltage is disabled, so that thyristor TH1 no longer conducts during any part of each opposite polarity half cycle. The bimetallic heating element 16 is then supplied with "full power" during a heating interval T2 as shown in FIG. 3. During interval T2, the bimetallic strip 12 deflects until it operates the latching mechanism as described above, with reference to FIG. 1. Switch 22 closes after interval T2 (as a result of the small displacement of the bread carrier, i.e. when camming surface 11 is released from abutment 7 so that the camming surface 21 subsequently engages abutment 8). When switch 22 closes, positive and negative half cycles of power are shunted across the bimetallic heating element 16 so that the bimetallic strip 12 is no longer heated. The strip 12 therefore cools during an interval T3 as shown in FIG. 3. At the end of interval T3, the strip 12 has cooled sufficiently to release abutment from the camming surface 21, whereupon the carrier 1 springs upwardly from the body of the toaster causing switch SW1 to open.

The toasting cycle may be repeated by once more depressing the bread carrier 1 into its lowermost latched position.

The intervals T1, T2 and T3 can each be maintained substantially constant despite variations in temperature within the body of the toaster. Therefore, depending on the setting of variable resistor RV1 (for obtaining a desired shade of toast), accurate and fixed toasting intervals can be repeatedly maintained. Generally, the heating interval (T1 and T2) may be roughly equal to the cooling interval (T3), but a longer cooling interval is preferable. Typically, the periods T1, T2 and T3 are respectively 35 seconds, 15 seconds and 100 seconds thereby giving a toasting cycle of 150 seconds. The toasting cycle is preferably kept as short as possible so that the toast is crisp on the outside and soft on the inside.

Preferably, the bimetallic member 1 is more sensitive than those used in prior art toasters. For example, in a toaster embodying the invention, the specific deflection of the bimetallic member is about $20.8 \times 10^{-6°}$ $C.^{-1}$. Such a bimetallic member is available from Bulten-Kanthal under their Ser. No. Kanthal 200. Bimetallic members used in prior art toasters are usually of the Kanthal type 115 TB 1170 having a specific deflection of about $11.7 \times 10^{-6}$ $°C.^{-1}$.

In toasters embodying the bimetallic actuator of FIGS. 1 and 2, apart from adjusting manufacturing tolerances, it is not necessary to adjust the gap between the end of the bimetallic strip and any targets in order to adjust the timing of the toasting cycle. The timing of the toasting cycle is carried out electronically by simply adjusting the variable resistance RV1 to vary the delay period. Hence, the gap between the end of the bimetallic strip 12 and the end 17 of lever 6 can be maintained constant, as can the displacement of the camming surface 21 with respect to the abutment 8, in order to promote repeatedly constant response times within the actuator system. This is particularly advantageous compared with conventional toasters where such gaps and displacements must be varied to adjust the shade of the toast and where longer response times mean extending the displacements or gaps by an amount which contributes to timing errors in successive toasting cycles.

Figure 4:
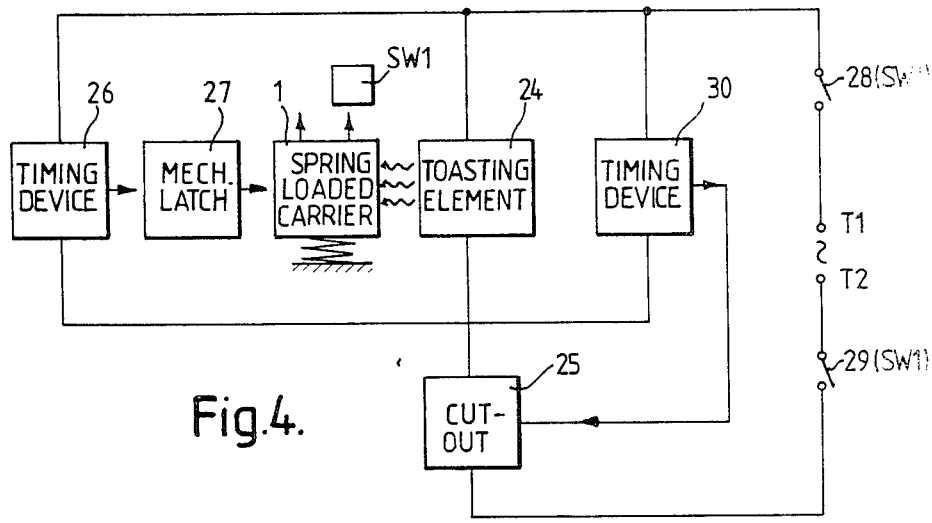
FIG. 4 is a block diagram illustrating a first embodiment of the invention.
Figure 5:
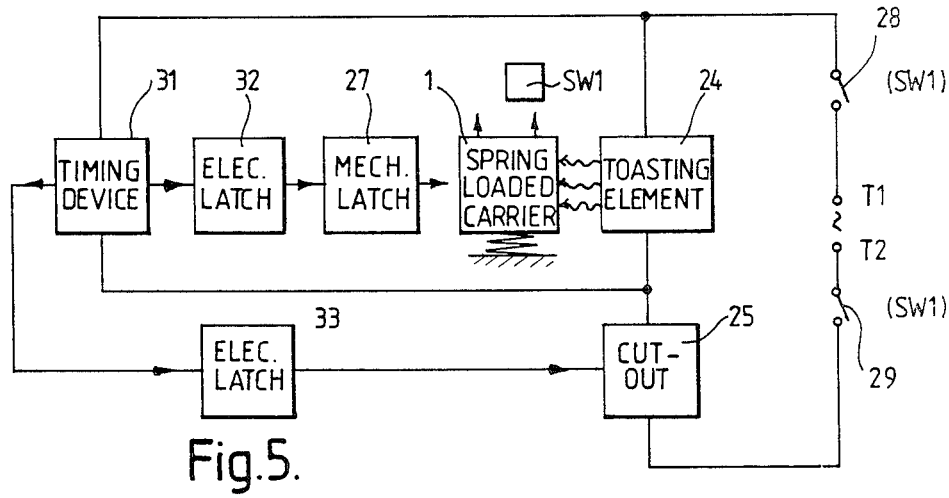
FIG. 5 is a block diagram illustrating a second embodiment of the invention.

FIGS. 4 and 5 are schematical block diagrams of the mechanical and electrical components of first and second embodiments of the invention.

In FIG. 4, toasting element 24 is connected in series with a cut-out 25 across main supply terminals T1, T2. A first timing device 26, which may incorporate the bimetallic actuator described above, operates a mechanical latch 27 (e.g. lever 6 in FIG. 1) which secures spring-loaded carrier 1 in an operative position adjacent toasting element 24. At the end of a toasting period, determined by timing device 26, the latch 27 releases the carrier 1 so that it moves into a position which is removed from the toasting element 24. Movement of the carrier 1 operates a switch SW1 having contacts 28, 29 in series with the supply terminals T1, T2.

A second timing device 30, which may be an electronic device (such as a 555 timer) is provided for operating the cut-out 25. After a predetermined period, which is longer than the toasting interval, but short enough to prevent combustion of the food product (e.g. 3.5–4.0 minutes), the timing device 30 causes cut-out 25 to interrupt the power supply to toasting element 24.

Both the first and second timing devices 25, 30 derive power from across the toasting element 24. Where necessary (e.g. in the case of an electronic timer requiring a DC supply), suitable circuit components are included for rectifying and smoothing the AC supply. Moreover, at least the second timing device 30 is automatically reset each time power is supplied to the toasting element 24. Resetting of the first timing device 26 may be necessary where, for example, it includes an electronic timer. However, timing device 26 may naturally reset itself, for example, in the case of a bimetallic actuator like the one described above.

In the embodiment shown in FIG. 5, an electronic timing device 31, such as a 555 timer, provides first and second outputs for respectively operating electronic latches 32, 33. Timer 31 is capable of running for a predetermined period before providing the second output whereby the electronic latch 33 causes cut-out 25 to interrupt the supply of power to the toasting element 24 (as in the previous embodiment). However, the timer 31 is automatically reset each time the toasting element 24 is energised. This will occur whenever the spring-loaded carrier 1 functions properly, at the end of a toasting interval, to operate switch SW1 and its contacts 28, 29.

The electronic latch 32 receives the first output from timer 31 after an interval corresponding with a predetermined toasting period, latch 32 then causing the mechanical latch 27 to release the spring-loaded carrier 1.

instead of using a timer which runs continuously over a predetermined period for preventing combustion of the food product, the timer may be adapted to run for a toasting interval (to operate the mechanical latch 4) and then to repeat this interval, a given number of times, before operating the cut-out 25.

In the bimetallic actuator described above with reference to FIGS. 1 and 2, the timer IC1 could be modified, or used with other circuitry, in order to provide a first output for timing the delay period and a second output for timing the predetermined period within which the cut-out 25 is operated to prevent combustion, or ignition of the food product.

A more detailed description will now be given of a preferred embodiment of the invention with reference to FIG. 6.

Figure 6:
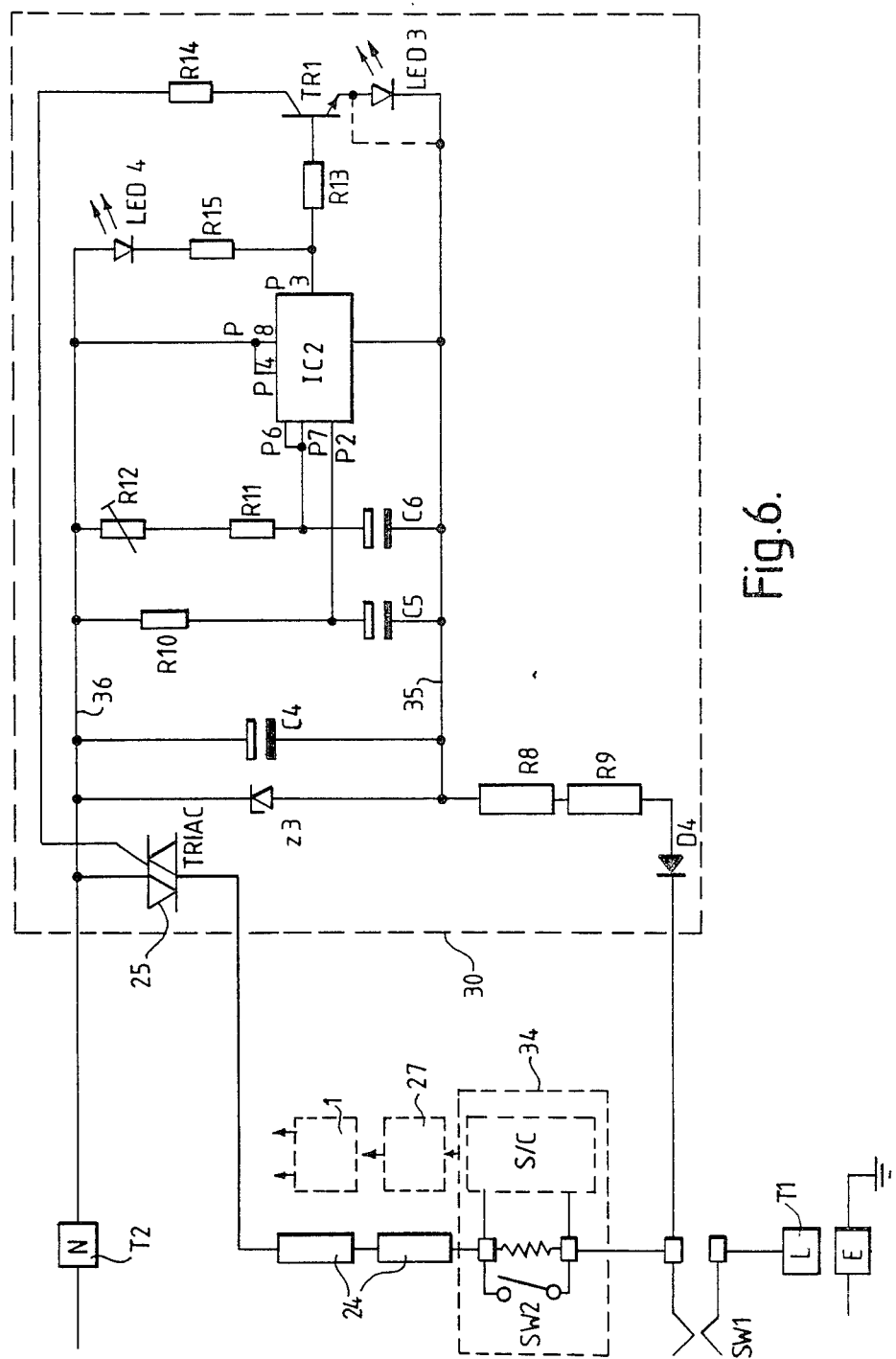
FIG. 6 is a circuit diagram illustrating a third embodiment of the invention.

The circuit shown in FIG. 6 employs a triac 25 as a cut-out, the triac being connected in series with toasting elements 24, i.e. between a neutral terminal T2 of the AC main supply and one of the element 24. The circuit also employs an electronic timer IC2 to control triac 25. The toasting elements 24 are connected in series with bimetallic actuator 34 which may be of conventional construction, or (as shown schematically in the drawing) it may be as described above with reference to FIGS. 1 and 2. Such an actuator comprises the electrical heating element 16 (FIG. 1) wound on a bimetallic strip (not shown) in FIG. 2 (but shown as 12 in FIG. 1), the strip deforming, when heated, in order to operate electrical contacts (SW2). It further comprises a mechanical latch (27) which normally holds the spring-loaded carrier (1) of the toaster in its operative or toasting position and the adjustable "shade control" 23 (FIG. 1), which initially delays the supply of power to the heating element 16 by shunting the element 16 (with a thyristor TH1 within the shade control 23), so as to divert a major proportion of the power which would otherwise be supplied to element 16, as described above. At the end of the delay period, the full amount of power is supplied to element 16. The bimetallic strip then deforms and eventually causes the contacts of switch SW2 to close thereby short circuiting element 16 and thus allows the bimetallic strip to cool down. As the bimetallic strip cools, it eventually releases latch 27 which holds the spring-loaded carrier (1) in its operative position. This occurs at the end of a predetermined toasting interval. When carrier (1) is released, it opens the contacts of switch SW1 in order to isolate the toasting elements from the mains supply.

The electronic circuit 30 (shown mainly within the broken outline) will now be described in more detail.

Circuit 30 includes a triac 25, which serves as a cut-out, and an integrated circuit IC2, which is a 555 timer. Timer IC2 turns triac 25 on when the circuit 30, is supplied with power (as explained in more detail below) and turns it off at the end of a predetermined cut-out period which is longer than the toasting interval. This prevents combustion of the food product in the event that the spring loaded carrier jams and fails to open the contacts of switch SW1.

Circuit 30 derives DC power from a diode D4, connected to the non-live contact of switch SW1, whereby rectified current is supplied through dropping resistors R8, R9 to capacitor C4 connected between the negative and positive rails 35, 36. A zener diode Z3 is connected across capacitor C4 whereby a smoothed 12 volt DC supply is maintained across the negative and positive rails.

When the spring-loaded carrier (1) is in its operative or latched position, the contacts of switch SW1 are closed and DC power is supplied to circuit 30. Capacitor C5 then starts to charge, via resistor R10, causing a "low" input to be applied to pin P2 of timer IC2. This triggers timer IC2, i.e. it initiates the predetermined cut-out period. Pin P2 is initially held low for long enough to initiate timer IC2 and is allowed to reach a "high" level during the cut-out period (i.e. never after). (The time constant for C5, R10 should be longer than one microsecond and less than the cut-out period). Once triggered, timer IC2 runs, pin P2 is disabled and pin P3 is at a "high" level thereby causing transistor TR1 to turn "on" via resistor R13. This enables current to flow through the gate of triac 25, thereby turning it "on" whereby toasting elements 24 are provided with AC power from supply terminals T1, T2. A "high" level is maintained on pin P3 throughout the cut-out period whereby triac 25 remains "on" throughout the same period (which is longer than the toasting interval).

The extent of the cut-out period is determined by capacitor C6, resistor R11 and present resistor R12. R12 may be preset by the manufacturer to ensure that the cut-out period prevents any substantial combustion, or ignition of the food product. Capacitor C6 therefore charges slowly over the cut-out period until it eventually applies a "high" level to the interconnected pins P6, P7 of timer IC2. This triggers the timer IC2 to terminate the cut-out period whereby pin P3 returns to a 'low" and turns transistor TR1 off. This terminates current flow through the gate of triac 25, whereby the triac is turned "off" and the toasting elements 24 are isolated from the AC supply. Capacitor C6 is discharged (by an internal transistor in timer IC2) via pin P7 at the same time as pin P3 returns to a "low".

An optional green LED 3 is connected to the emitter of transistor TR1 and is illuminated when TR1 is turned "on". This indicates to the user that power is being supplied to the toasting elements 24. LED 3 is extinguished when TR1 is turned off at the end of the cut-out period. If LED 3 is not required, the emitter of TR1 is connected to rail 35 as shown by the broken line.

Circuit 30 is only in operation during a normal (fault-free) toasting interval because it is supplied with current via switch SW1. As long as the spring-loaded carrier 1 works properly, switch SW1 will be opened when the carrier is released after the toasting interval. However, in the event that carrier 1 jams, switch SW1 remains closed and power thereby continues to be supplied to circuit 30 to operate the timer IC2.

A red LED 4, connected in series with the resistor R14, is supplied with current when pin P3 of timer IC2 returns to a "low" level at the end of the cut-out period. This indicates to the user that carrier 1 has jammed. LED 4 and R5 may be omitted if not required.

Different timing devices, other than those shown in FIG. 6, may be used for timing the toasting interval and the cut-out period. Whilst different embodiments of the invention have been described, further modifications and/or changes may be made within the scope of the invention.

We claim:

1. A toaster comprising a food product carrier for supporting a food product to be toasted; one or more toasting elements; means for securing the carrier in an operative position adjacent the toasting element or elements; timing means which is initiated when the food product carrier is secured in the operative position adjacent the toasting element or elements, the timing means releasing the carrier from its operative position after a predetermined interval to allow the carrier to move into a position where it is removed from the toasting element or elements, the predetermined interval being the time intended for toasting a food product supported by the carrier, said timing means also being adapted to interrupt the supply of power to the toasting element or elements within a predetermined period for preventing combustion or ignition of the food product when the carrier does not move into said position where it is removed from the toasting element or elements, the latter period being longer than the predetermined interval for toasting the food product.

2. A toaster according to claim 1, wherein the timing means comprises a first timing device for controlling the toasting interval, and a second timing device for controlling said predetermined period for preventing combustion or ignition of the food product.

3. A toaster according to claim 2, wherein the first timing device incorporates a bimetallic actuator and the second timing device comprises an electronic timer, said electronic timer being automatically reset each time the toaster element is energised.

4. A toaster according to claim 2 or 3 wherein the second timing device comprises a capacitor which is charged over said predetermined period and a cut-out device which interrupts the power supplied to the toasting element when the charge on said capacitor reaches a predetermined level.

5. A toaster according to claim 4 wherein the second timing device comprises an electronic timer and a second capacitor, said second capacitor being initially charged when power is supplied to the toaster so as to cause said timer to initiate said predetermined period, said first-mentioned capacitor being connected to the electronic timer so as to cause said predetermined period to be terminated when the charge on said first capacitor reaches the predetermined level.

6. A toaster according to claim 1 wherein the timing means comprises a first timing device for controlling the toasting interval, and a second timing device for controlling the predetermined period to prevent combustion or ignition of the food product; said second timing device comprising a cut-out device for interrupting the power supplied to the toasting element, an electronic timer, first and second capacitors connected to respective inputs of said timer, respective first and second means for charging said capacitors, and switching means connected to an output of said timer and to said cut-out device; said first capacitor being charged by said first means over said predetermined period wherein said cut-out device interrupts the power supplied to the toasting element when the charge on the first capacitor reaches a predetermined level, and said second capacitor being initially charged by said second means when the power is supplied to said second timing device so as to cause said predetermined period to be initiated.

7. A toaster according to any one of claims 2-6 further including a switch which is opened by the movement of the food product carrier whereby the supply of power to the toasting element is normally interrupted after the food product carrier has been released, said second timing device being supplied with power only whilst said switch is closed.

8. A toaster according to claim 6 or 7 further including first indicating means connected to said switching means for providing an indication that the toasting element is being supplied with power, and second indicating means connected to the output of said timer for providing an indication when said cut-out device interrupts the supply of power the toasting element.

9. A toaster according to claim 1 wherein the timing means provides first and second outputs which are used respectively to release the carrier from its operative position after the toasting interval and for interrupting the supply of power to the toasting element within the predetermined period for preventing combustion or ignition of the food product.

10. A toaster comprising:
(a) a food product carrier for supporting a food product to be toasted;
(b) one or more heating elements for toasting a food product supported by said carrier when said carrier is in an operative toasting position adjacent said element or elements;
(c) means for biasing said carrier into a non-operative position whereby said food product is removed from said toasting element or elements;
(d) means for securing said carrier in said operative position;
(e) a bimetallic actuator which is supplied with power when said carrier is in said operative position, said bimetallic actuator being provided for timing a predetermined interval intended for toasting said product and being operative to actuate said securing means in order to release said carrier after said predetermined interval;
(f) electronic timing means which is also supplied with power when said carrier is in said operative position, said electronic timing means being provided for timing a predetermined period which is longer than said predetermined interval and which is intended to prevent combustion or ignition of said food product;
(g) switch means responsive to movement of said carrier and provided for supplying power to said bimetallic actuator and to said electronic timing means when said carrier is in said operative position, said switch means normally being actuated by said carrier, after said carrier has been released from said securing means, so as to interrupt the supply of power to said bimetallic actuator and to said electronic timing means, but said switch means continuing to supply power to said electronic timing means after said securing means has been actuated by said bimetallic actuator but said carrier has not moved into said non-operative position.

* * * * *